United States Patent
Phan Huy et al.

(10) Patent No.: US 9,291,779 B2
(45) Date of Patent: Mar. 22, 2016

(54) OPTICAL DEVICE HAVING LIQUID-CORE OPTICAL FIBER AND METHOD FOR PRODUCING SUCH A DEVICE

(71) Applicant: Centre Nationale de la Recherche Scientifique—CNRS, Paris (FR)

(72) Inventors: Minh Châu Phan Huy, Massy (FR); Philippe Delaye, Paris (FR); Sylvie Lebrun, Gometz-la-Ville (FR); Gilles Pauliat, Marcoussis (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 0 days.

(21) Appl. No.: 14/430,081

(22) PCT Filed: Sep. 20, 2013

(86) PCT No.: PCT/EP2013/069638
§ 371 (c)(1),
(2) Date: Mar. 20, 2015

(87) PCT Pub. No.: WO2014/044829
PCT Pub. Date: Mar. 27, 2014

(65) Prior Publication Data
US 2015/0212279 A1 Jul. 30, 2015

(30) Foreign Application Priority Data
Sep. 21, 2012 (FR) ...................................... 1258870

(51) Int. Cl.
*H01S 3/30* (2006.01)
*G02B 6/38* (2006.01)
(Continued)

(52) U.S. Cl.
CPC .............. *G02B 6/3826* (2013.01); *G02B 6/032* (2013.01); *G02B 6/02295* (2013.01);
(Continued)

(58) Field of Classification Search
CPC ....... H01S 3/302; H01S 3/307; G02B 6/3624; G02B 6/3825; G02B 6/3826; G02B 6/032; G02B 2006/0325; G02B 6/02295
USPC ............................................. 385/85–88, 147
See application file for complete search history.

(56) References Cited

U.S. PATENT DOCUMENTS 3,770,350 A 11/1973 Stone et al.
4,045,119 A 8/1977 Eastgate
(Continued)

FOREIGN PATENT DOCUMENTS

DE 24 33 219 A1 1/1976
JP S62-157013 A 7/1987

OTHER PUBLICATIONS

E. Ippen, "Low-Power Quasi-cw Raman Oscillator," Applied Physics Letters, vol. 16, No. 8, Apr. 15, 1970, pp. 303-305 (3 pages).
(Continued)

*Primary Examiner* — Akm Enayet Ullah
(74) *Attorney, Agent, or Firm* — Osha Liang LLP

(57) ABSTRACT

The connection device for liquid-core optical fiber comprises a sleeve traversed by a channel comprising a plurality of communicating stacked conduits, a first conduit being formed from an end of the sleeve and being arranged to receive, in a sealed manner, at the corresponding end of the sleeve, one end of the optical fiber, and a second conduit being formed communicating with the first conduit, and closing means that hermetically seal the end of the second conduit opposite the end that communicates with the first conduit, the sleeve further having a third conduit for filling the internal volume of the second conduit when the latter is closed at one end by the closing device and the fiber is inserted into the first conduit, the third conduit transversely connecting the outside of the sleeve with the inside of the second conduit, and a sealing plug for hermetically sealing the port of the third conduit opening to the outside of the sleeve.

16 Claims, 6 Drawing Sheets

(51) Int. Cl.
  *G02B 6/032*   (2006.01)
  *G02B 6/36*    (2006.01)
  *G02B 6/02*    (2006.01)

(52) U.S. Cl.
  CPC ............ *G02B 6/3624* (2013.01); *G02B 6/3825* (2013.01); *G02B 2006/0325* (2013.01); *H01S 3/302* (2013.01); *H01S 3/307* (2013.01)

(56) References Cited

U.S. PATENT DOCUMENTS

| | | | |
|---|---|---|---|
| 5,604,587 A | 2/1997 | Che et al. | |
| 6,723,435 B1 * | 4/2004 | Horne | C03B 37/0128 385/125 |
| 7,062,140 B2 | 6/2006 | Bjarklev et al. | |
| 7,362,937 B2 * | 4/2008 | Katayama | C03B 37/01211 385/123 |
| 7,483,615 B2 * | 1/2009 | Mihailov | C03B 37/15 385/125 |
| 7,489,847 B1 * | 2/2009 | Moore | G02B 6/032 385/123 |
| 2004/0233458 A1 * | 11/2004 | Frick | G01D 5/268 356/480 |

OTHER PUBLICATIONS

International Search Report issued in PCT/EP2013/069638, mailed Jan. 17, 2014 (3 pages).
Written Opinion issued in PCT/EP2013/069638, mailed Jan. 17, 2014 (5 pages).

* cited by examiner

OPTICAL DEVICE HAVING LIQUID-CORE OPTICAL FIBER AND METHOD FOR PRODUCING SUCH A DEVICE

The present invention relates to connectors and connecting techniques for optical fibers, or more specifically to connectors and connecting techniques for liquid-core optical fibers.

Liquid-core optical fibers and light guides have been the subject of a sustained research and development effort for several decades as they are applicable to advantageous effect in a range of applications that is continuing to increase.

Various applications for liquid-filled hollow-core optical fibers are in particular known, which applications generally depend on particularities of the liquids used to fill the fiber core, and specific properties of the fibers used. For example, liquid-core fibers are used to observe and study the Raman effect produced at one end of the fiber when the material filling the fiber core is excited by a laser source coupled to the other end thereof. Such assemblies require couplers (or connectors) that transmit light to be placed at the input and output of the fiber in order to allow the exciting signal emitted by the laser source to be injected into the fiber, and the properties of the signal output from the fiber to be analyzed.

An example of a procedure using a liquid-core fiber as a cell containing a liquid to be analyzed by Raman spectroscopy is described in U.S. Pat. No. 3,770,350. To carry out the desired analysis, the application described requires the fiber to be filled with the liquid and light to be coupled to the fiber, which assumes that the fiber can be filled with a liquid non-definitively and that the liquid inserted into the fiber can be changed.

Furthermore, what are referred to as "microstructured" optical fibers (or sometimes "photonic-crystal fibers") have been under development for a few years for a variety of applications (telecommunications, nonlinear optics etc.) and have properties that are so advantageous that their use is rapidly becoming widespread. A microstructured fiber is a fiber containing microstructures taking the form of cavities extending over the length of the fiber, and the cross section of which forms a matrix of cavities defining the microstructure. Various examples of micro-structured fibers are described in U.S. Pat. No. 7,062,140.

Microstructured fibers may thus be employed in applications in which the cavities thereof forming the microstructure are filled with liquid, in order to access the aforementioned applications. "Microstructured liquid-core fibers" or even "liquid-core fibers" are then spoken of, this designation generally applying to fibers the cavities (forming the microstructure) of which are filled with liquid, without these liquid-filled cavities necessarily being located exclusively in the core or in the central portion of the cross section of the fiber. By way of example, in the present document a liquid-core fiber is thus considered to be a fiber having the central portion of its cross section and a portion of the cladding surrounding this central portion pierced with cavities, the cavities being filled with liquid (or being intended to be filled with liquid).

It is necessary, in the case of an application employing liquid-core fibers, to consider using fiber input and output connectors that are also usable with liquid-core fibers.

Various techniques have thus been developed for closing one end of a liquid-core fiber, whether by means of a coupling device or otherwise.

As far as liquid-core fibers are concerned, unsatisfactory results are obtained using a fiber splicer to seal the end of a fiber, because of the coupling losses that result from the end sealing operation. Furthermore, it proves to be particularly difficult to seal both ends of a liquid-core fiber, if it is desired for the quality of the optical beam passing through the fiber to remain satisfactory.

It is therefore necessary to consider using connectors (or couplers) fitted at each end of a liquid-core optical fiber. However, existing devices do not meet or meet only partially a set of constraints that must be met if the whole variety of applications to which liquid-core optical fibers lend themselves are to be successfully exploited.

Among these constraints, mention may for example be made of the need, as indicated above, to be able to fill the fiber with a liquid non-definitively, and to be able to change the liquid inserted into the fiber, while reconciling this advantage with the need to sealably and durably couple the optical fiber and the connector. The latter constraint is related to the need to prevent evaporation of the liquid and emptying of the fiber.

Furthermore, connector/liquid-core fiber devices, once assembled, must be able to withstand temperature variations related to the operating conditions of the device or temperature variations encountered during storage. These temperature variations create risks that existing devices are not designed to cope with. For example, during a decrease in temperature, liquids having an expansion coefficient higher than that of the fiber will see their pressure decrease, creating bubbles in the core of the fiber that will hinder or even prevent propagation of light in the fiber. In contrast, an increase in temperature will lead to an overpressure in such liquids, which overpressure may rapidly become substantial and generate stresses in the device that will possibly represent a danger to adhesively bonded elements of the device or even to the fiber itself, possibly causing the assembly to leak or even burst.

Furthermore, connector/liquid-core fiber devices, once assembled, must be able to withstand vibrations and changes of orientation, such as being flipped upside down, during handling and transportation, by post for example.

One aim of the present invention is to provide a solution to the drawbacks of the optical-fiber connector devices described above.

Thus, the invention proposes a connecting device for liquid-core optical fibers, also called a connector in the present description, that is compact, easily handleable and that may have similar size to standard fiber connectors, and a liquid-core optical device comprising a liquid-core optical fiber inserted into such a connector.

According to the present description, the connecting device comprises a sleeve of tubular structure through which a channel comprising a plurality of superposed and communicating ducts passes, a first duct being formed from one end of the sleeve and being arranged to receive hermetically at the corresponding end of the sleeve one end of the optical fiber, and a second duct being formed communicating with the first duct; and closing means hermetically closing that end of the second duct which is opposite the end communicating with the first duct, in which the sleeve furthermore contains a third duct intended for filling the interior volume of the second duct when the latter is closed at one end by the closing device and the fiber is inserted into the first duct, the third duct connecting transversely the exterior of the sleeve to the interior of the second duct, the device furthermore comprising a hermetic closing cap for hermetically closing the orifice of the third duct opening onto the exterior of the sleeve.

According to the present description, an optical fiber having a core filled with a liquid is inserted into the connecting device, the interior volume of the second duct of the connecting device comprises the liquid and a gas bubble, and the third duct of the connecting device is hermetically closed by the closing cap.

Incorporating a gas bubble during assembly of the device advantageously meets the constraint regarding temperature variations, the gas bubble, since it is capable of changing volume (the gas being compressible), being able to absorb pressure variations induced in the liquid by temperature variations, and to do so whatever the nature of the liquid of the liquid-core optical fiber and whatever the nature of the material used for the cladding of said fiber.

Because of flips, changes of orientation and vibrations during handling and transportation of the liquid-core optical fiber device, the bubble may move about in the connecting device.

According to one variant, the optical fiber is inserted into the sleeve over a length longer than the length of the first duct, so as to pass through the first duct and penetrate into the second duct, without making contact with the closing device of the connecting device.

The volume of the bubble may moreover advantageously be adjusted between a minimum volume and a maximum volume, such that the bubble cannot take up a position at the end of the fiber, in order to prevent it from entering into the fiber and/or interfering with the passage of beams.

Thus, according to one variant, the gas bubble is such that its diameter remains larger than the distance between the end of the optical fiber inserted into the channel of the sleeve and the closing device of the connecting device in the entire temperature range expected to be encountered during operation, transportation and storage of the device.

In one particular embodiment of the liquid-core optical fiber device, the volume of the gas bubble is such that its diameter remains smaller than the distance separating the fiber from that of the walls of the second duct from which the third duct emerges, in the entire temperature range expected to be encountered during operation, transportation and storage of the device. Thus, during changes of orientation of the sleeve, the bubble remains approximately spherical under the action of surface tension and does not cover the end of the fiber.

In one embodiment, the closing means comprise a window hermetically closing the sleeve at its end corresponding to the second duct, the window enabling optical coupling.

The window makes it possible to be able to access the input and output faces of the fiber optically, once each of the ends of the latter has been fitted in a connecting device according to this embodiment, and thus to be able to couple an optical beam to the fiber and recover the beam transmitted and generated by the latter.

In another embodiment, the closing means comprise a superposed fourth duct communicating with the second duct in the channel of the sleeve, formed from the other end of the sleeve and arranged to receive hermetically at the corresponding end of the sleeve one end of an optical fiber, in which the first and fourth ducts are coaxial, and in which the closing means furthermore comprise an end of an optical fiber hermetically inserted into the fourth duct.

Provision is thus made in this embodiment to connect one end of two optical fibers to each of the ends of the sleeve of the connecting device, respectively, the connecting device not necessarily being connected to two liquid-core optical fibers. Specifically, it is possible to envision connecting an access fiber (not necessarily one with a liquid core) to one end of a connecting device according to this other embodiment, this access fiber generating an optical beam intended for a liquid-core fiber connected to the other end of the connecting device.

The face of the liquid-core optical fiber may therefore be accessed directly, using free-space beams and coupling optics (connecting device with a window), or by fiber coupling, using an access fiber brought almost into contact with the liquid-core fiber.

Provision may moreover be made to append to the device a ferule, i.e. a rigid tube, preferably of length corresponding to the length of the first duct of the sleeve, containing over its entire length a channel arranged to receive hermetically one end of the optical fiber. In this configuration, the first duct is arranged to receive the ferule hermetically at the corresponding end of the sleeve.

In one particular embodiment, the first and second ducts are coaxial and of the same diameter, and the ferule has a diameter corresponding to that of the first and second ducts in order to be inserted hermetically over its entire length into the first duct.

Another aspect of the present invention relates to a method for connecting a liquid-core optical fiber to a connecting device such as proposed, which method comprises inserting one end of the optical fiber hermetically into the first duct of the sleeve of the connecting device over a length smaller than the cumulative length of the first and second ducts; filling the interior volume of the sleeve of the connecting device made up of the second and third ducts via the external orifice of the third duct with a liquid provided to fill the core of the optical fiber; and closing, after the filling has ended, the orifice of the third duct so as to inject into the interior volume a gas bubble.

In one particular embodiment of the proposed method, the interior volume of the sleeve of the connecting device is partially filled, and the gas bubble is injected by closing the external orifice of the third duct with the closing cap.

Furthermore, a level of partial filling of the interior volume of the sleeve of the connecting device may then be determined, and a closing cap of preset length may then be used to plug the third duct so as to inject, into the interior volume, when the external orifice of the third duct is closed with the closing cap, a gas bubble of preset volume.

As a variant, the interior volume of the connecting device may be partially filled to a preset level corresponding to a preset volume of the gas bubble injected into the interior volume when the external orifice of the third duct is closed.

In one particular embodiment of the proposed method, the optical fiber is inserted into the sleeve over a length longer than that of the first duct, so as to pass through the first duct and penetrate into the second duct, without making contact with the closing device of the connecting device.

In one particular embodiment of the proposed method, the gas bubble is injected so as to inject a gas bubble the diameter of which remains larger than the distance between the end of the optical fiber inserted into the channel of the sleeve and the closing device of the connecting device in the entire temperature range expected to be encountered during operation, transportation and storage of the device.

In one particular embodiment of the proposed method, the gas bubble is injected so as to inject a gas bubble the diameter of which remains smaller than the distance separating the fiber from that of the walls of the second duct from which the third duct emerges, in the entire temperature range expected to be encountered during operation, transportation and storage of the device.

The proposed method and the associated optical device have the advantage of allowing connectors to be produced that may be miniaturized and easily transported, and that allow a liquid-core fiber to be filled with liquid and this liquid to be durably and sealably contained in the fiber, while also making it easy to couple light to the fiber.

Moreover, if devices for implementing certain applications of liquid-core optical fibers, whether microstructured or not, are to be produced it must be possible for the fiber to be filled with the chosen liquid and then for this liquid to be sealably and durably preserved in the fiber (constraints related to temperature variations especially needing to be addressed to do this) while maintaining a good level of optical coupling at the input and output of the fiber to laser sources or detecting systems, these devices necessarily being as compact as possible. The proposed method and connector meet these requirements while making it possible for the fiber to be completely filled with the chosen liquid, the liquid to be confined in the core of the fiber, and the durability of the system, especially with regard to temperature variations to which the device may be subject, to be guaranteed by means of controlled insertion, into the connector, of a gas microbubble.

Other particularities, features and advantages of the present invention will become apparent from the description of nonlimiting example embodiments, given below with reference to the appended drawings in which:

FIG. 1a illustrates one implementation of the proposed connecting device for liquid-core optical fibers according to a first embodiment.

Figure 1A:
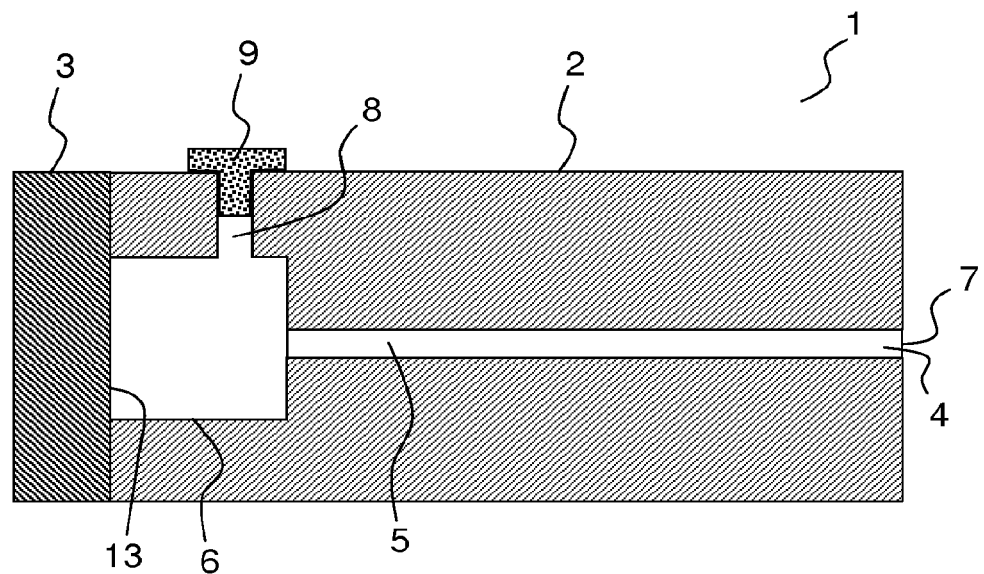
FIG. 1a shows a cross-sectional view of a connector according to a first embodiment.

With reference to FIG. 1a, the proposed connector 1 may comprise a sleeve 2 and a window 3. The sleeve 2 has a tubular structure comprising a through-channel 4 in the direction of its length and resulting from two ducts 5 and 6 formed in the interior of the sleeve, of different cross sections and superposed so as to communicate and form the through-channel of the sleeve. A first end of the channel 4 is formed at a first end 7 of the sleeve 2, and corresponds to a first duct 5, whereas the second end of the channel 4 is formed at the other end of the sleeve 2 (in the direction of its length) and corresponds to a second duct 6, of larger cross section than the first duct 5.

The first duct 5 may be formed and/or dimensioned so as to make it possible to insert therein one end of the optical fiber to which the connector 1 is provided to be coupled, said end of the fiber being inserted via the corresponding end 7 of the sleeve 2 over substantially the entire length of the duct 5. When the optical fiber is coupled to the connector 1, its end is hermetically inserted over the length of the first duct, i.e. the space between the external sheath of the fiber and the walls of the duct 5 is hermetically closed. This hermetic coupling between the fiber (not shown in the figure) and the first duct 5 of the channel 4 may be achieved by any known means, and especially by adhesive bonding by any known means, for example by adhesive bonding the external sheath of the fiber to the walls of the duct 5 by baking in an oven.

Advantageously, the length of the first duct is dimensioned so as to guide the fiber during its insertion and minimize transverse and angular movement of the end of the fiber while it is being fastened. For a standard fiber diameter (typically between 100 and 200 µm) this length is for example longer than or equal to 5 mm, typically about 10 mm and for example between 5 and 15 mm.

The cross section of the second duct 6 may be circular in shape or its shape may even correspond to any shape (triangular, square, rectangular, etc.) formed by a closed curve. These variants of the shape of the cross section of the duct are valid for all the example embodiments described below. The same goes for the first duct 5, except that, this duct being provided to have the optical fiber to be coupled to the connector 1 inserted therein, it will possibly be preferable for the dimensions and shape of the cross section of the first duct 5 to correspond to the dimensions and shape of the external sheath of the optical fiber that it is desired to fit into the connector, it being understood that the fiber must be able to be inserted then hermetically coupled to the first duct 5.

As a variant of the structure illustrated in FIG. 1a, it is possible to envision providing one or more other superposed and communicating ducts to form the channel 4, nonetheless without departing from the scope of this first embodiment. For example, it is possible to envision providing an intermediate duct between the first and second ducts 5, 6 in the implementation of the proposed connecting device according to this embodiment.

The internal volume of the sleeve 2 defined by the second duct 6 is closed at the corresponding end of the sleeve by a window 3 that seals the assembly and that allows a focused laser beam to be injected (into the connector, and therefore toward the fiber when it is fitted in the connector). The window 3 may be hermetically fastened to the sleeve by adhesive bonding or, as a variant, by any hermetic fastening means known per se. The window 3 thus forms a means for hermetically closing that end of the second duct 6 which is opposite the end communicating with the first duct 5, and is transparent so as to enable optical coupling to the fiber inserted in the connector 1.

Various transparent materials and shapes may be appropriate for the window (3). The latter may for example be made of glass, or even sapphire. It may take the form of a plate, for example of 2 mm in thickness, or be shaped like a lens. The latter case has the advantage of allowing a light beam injected from the exterior of the connector to be focused on the end of the fiber coupled to the connector. When the window is a glass plate, a lens arranged and placed so as to focus a light beam injected from the exterior of the connector toward the end of the optical fiber coupled to the connector may be used. Using a window that is itself a lens fulfils this function of focusing a beam toward the end of the optical fiber coupled to the connector. An index-gradient lens may moreover advantageously be used, so as to make it easier to employ the connector, as it is easier to modify the focal plane of an index-gradient lens. Furthermore, the thickness of the window 3 may be chosen to be smaller than 2 mm, for example in order to meet specific constraints in terms of optical coupling.

The wall of the sleeve is drilled, above the internal volume defined by the second duct, right through its thickness, so that the sleeve has on its surface an orifice via which it is possible to fill the connector once the optical fiber has been fitted. The sleeve thus contains a third duct 8 drilled transversely, which extends from the exterior wall of the sleeve to the wall of the second duct in the interior of the sleeve. This third duct 8 is provided by way of duct for filling the internal volume of the connector 1 and the core of the optical fiber once the latter has been fitted in the connector 1. Provision is furthermore made to close hermetically the external orifice of this third duct 8, provided to fulfill the function of filling orifice, with a cap 9, in order to close it once the phase of filling the connector has terminated. In order to ensure the cap satisfactorily seals the opening, provision may be made for a flat, produced in the external wall of the sleeve level with the filling orifice, in the case of a sleeve having a curved cross section level with this orifice.

Figure 1B:
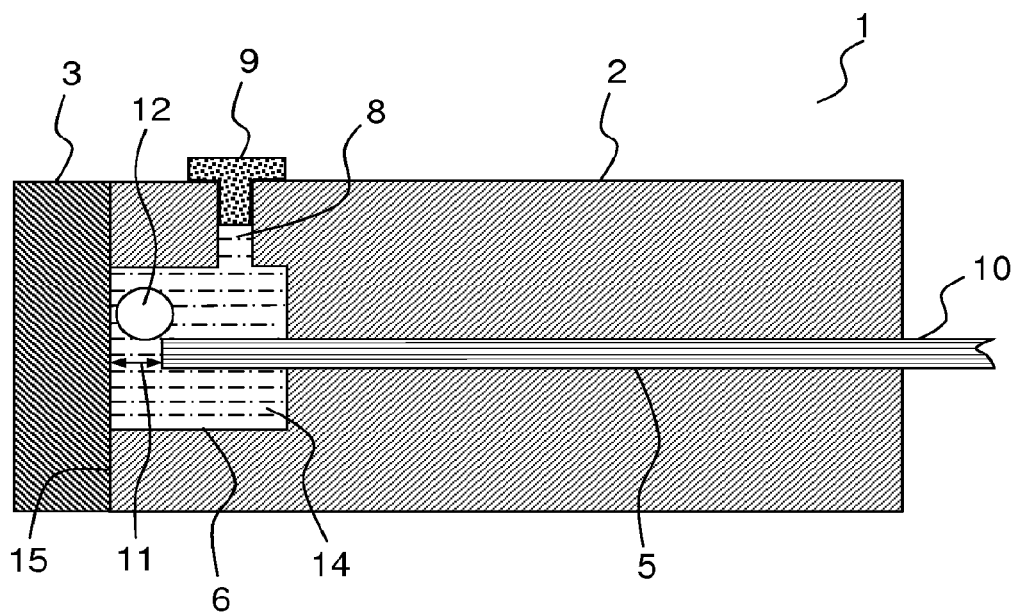
FIG. 1b shows a cross-sectional view of a connector according to a first embodiment coupled to a hollow-core optical fiber.

With reference to FIG. 1b, the optical fiber 10 is inserted into the first duct 5 of the connector 1 shown in FIG. 1a. The coupling between the external sheath of the optical fiber and the first duct 5 is hermetic, and likewise that between the window 3 and the annular end surface 1) of the sleeve corresponding to the second duct. Thus, the volume defined in the interior of the sleeve by the second and third ducts 6 and 8 is hermetically closed when the cap 9 for hermetically closing the third duct 8 is in place.

In the nonlimiting example in FIG. 1b, the optical fiber 10 is inserted into the first duct 5 over a length exceeding that of the first duct 5, before the fiber 10 and the first duct 5 are hermetically coupled. In this configuration, the end of the optical fiber 10 extends into the internal volume of the sleeve defined by the second duct 6, and is not coincident with that end of the first duct 5 which opens onto the second duct 6. The fiber 10 inserted into the connector 1 is inserted over a length not exceeding the cumulative length of the first and second ducts, so that the end of the fiber 10 inserted into the connector 1 does not make contact with the wall internal to the connector of the window 3. This defines a space 11, which is here referred to by the term "interstice", in the volume defined by the second duct, between the end of the fiber 10 and the portion of the surface of the internal wall of the window 3 opposite thereto.

Once the fiber has been fitted, i.e. once inserted into the first duct and second duct to the desired length, the connector 1 may be filled with the desired liquid 14. The cap 9 is removed and, via the filling orifice, the volume defined by the second and third ducts 6 and 8 is filled. At the end of this connector filling phase, a gas bubble 12 is injected and then the filling orifice is reclosed using the cap 9.

In a preferred embodiment of the proposed method for connecting a fiber to a connector, the interior volume defined by the second and third ducts is only partially filled, and the gas bubble is injected into the connector when the external orifice of the third duct is closed with the cap 9. In this embodiment, the partial fill is tailored to the size of the cap 9, insofar as the length of the third duct 8 plugged with the cap 9 when the latter is positioned to close the duct is taken into account.

It is also possible, as an option, to choose the size of the cap 9, and more particularly its length, so as to control the volume, given a preset partial filling level, of the gas bubble 12 injected when the cap 9 is inserted.

Advantageously, the third duct has a circular cross section the dimensions of which are smaller than the smallest dimension of the dimensions of the second duct, i.e. the dimensions of its cross section or its length. Advantageously, the diameter of the third duct is advantageously smaller than half the smallest dimension of the second duct. This configuration especially makes it possible to make it easier to produce the third duct and to better seal the device.

Figure 1C:
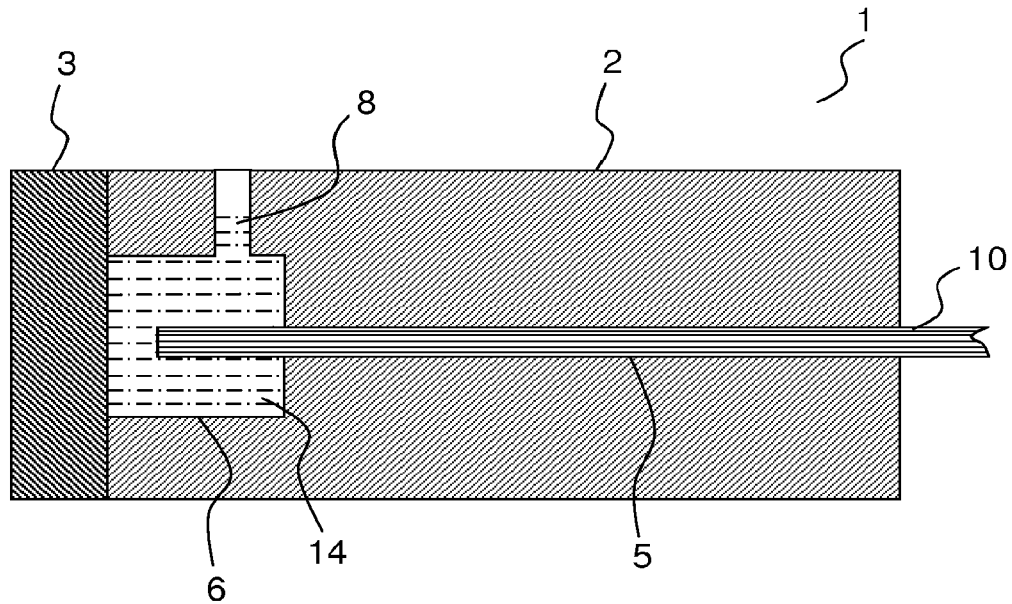
FIG. 1c shows a cross-sectional view of a connector according to a first embodiment coupled to a hollow-core optical fiber during the filling phase.
Figure 1D:
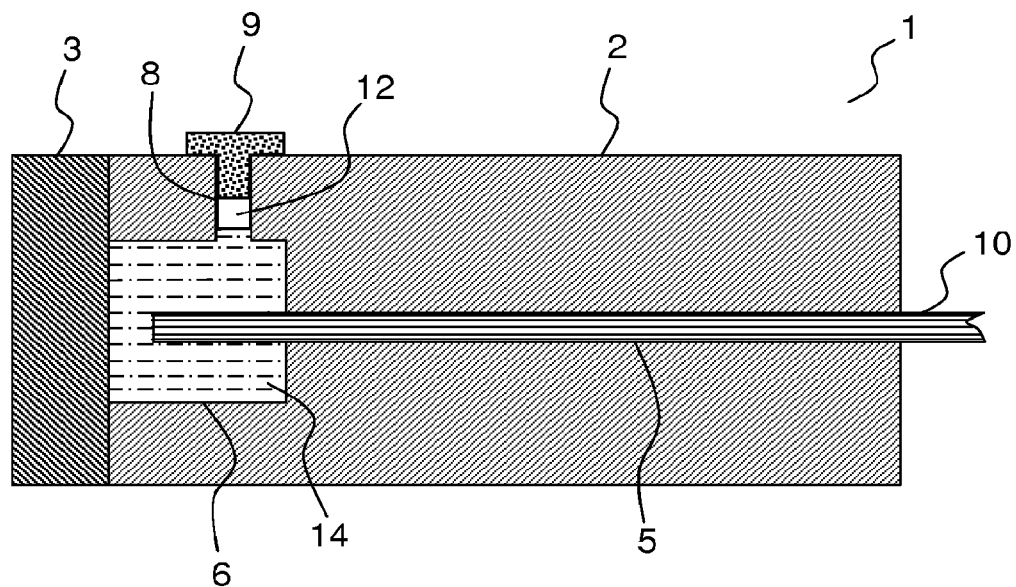
FIG. 1d shows a cross-sectional view of a connector according to a first embodiment coupled to a hollow-core optical fiber.

With reference to FIG. 1c, the volumes defined by the second and third ducts, respectively, communicate. The filling of the total volume defined by the second and third ducts has been controlled so that the volume defined by the second duct is completely filled with liquid 14, whereas the volume defined by the third duct is only partially filled with liquid 14. In the configuration shown in FIG. 1c, the (filling) third duct is positioned in the top part of the connector 1 so as to be located above the second duct 6. When the filling liquid is injected via the external orifice of the third duct 8, the liquid 14 first fills the lower part of the volume defined by the second duct 6, then the core of the fiber 10 by capillary action, air being pumped from the core of the fiber via the other end of the latter, before the top part of the second duct 6 and then the third duct 8 are filled. As a variant to what is shown in FIG. 1c, the volume defined by the second duct may be only partially filled (in which case, in the configuration shown, the third duct is not filled with liquid at all). With reference to FIG. 1d, the plugging length of the cap 9 being shorter than the length of the filling third duct 8, a bubble 12 of air (or of ambient gas) is injected by repositioning the cap 9 once the partial filling phase has been completed.

With reference to FIG. 1b, the material used for the cap 9 will be chosen to be resistant to the liquid used. Teflon is an example of a material usable for the cap 9 and that resists well liquid such as methanol, ethanol, acetone, benzene, nitrobenzene, toluene or xylene.

The cap 9, while sealably closing the connector, is removable and may be removed in order for example to change the liquid. In one variant embodiment in which it is desired to seal definitively the connector, the cap 9 is adhesively bonded in place, the entirety of the assembly possibly furthermore being protected by a jacket, a heat-shrinkable jacket for example.

In one preferred embodiment, the size of the bubble injected into the connector is chosen so as to compensate for pressure variations induced by temperature cycles. More specifically, the size of the bubble is chosen so that, during temperature variation cycles, the bubble does not disappear or fragment. For example, in a temperature cycle including a temperature increase followed by a temperature decrease, the disappearance of the bubble during the increase in the temperature around the connector would be followed by the creation of another bubble during the cooling phase, in an uncontrolled position in the connector/fiber assembly.

In one preferred embodiment, the minimum size of the bubble is furthermore chosen so as to ensure that the bubble cannot get stuck in front of the fiber, as this could result in gas being injected into the core of the fiber and propagation of light in the latter being disrupted.

In one preferred embodiment, the maximum size of the bubble is furthermore chosen such that when the orientation of the sleeve changes, the bubble remains approximately spherical under the action of surface tension and cannot cover the end of the fiber.

Typically, its diameter remains smaller than the distance separating the optical fiber from that wall of the second duct from which the third duct emerges.

Figure 2:
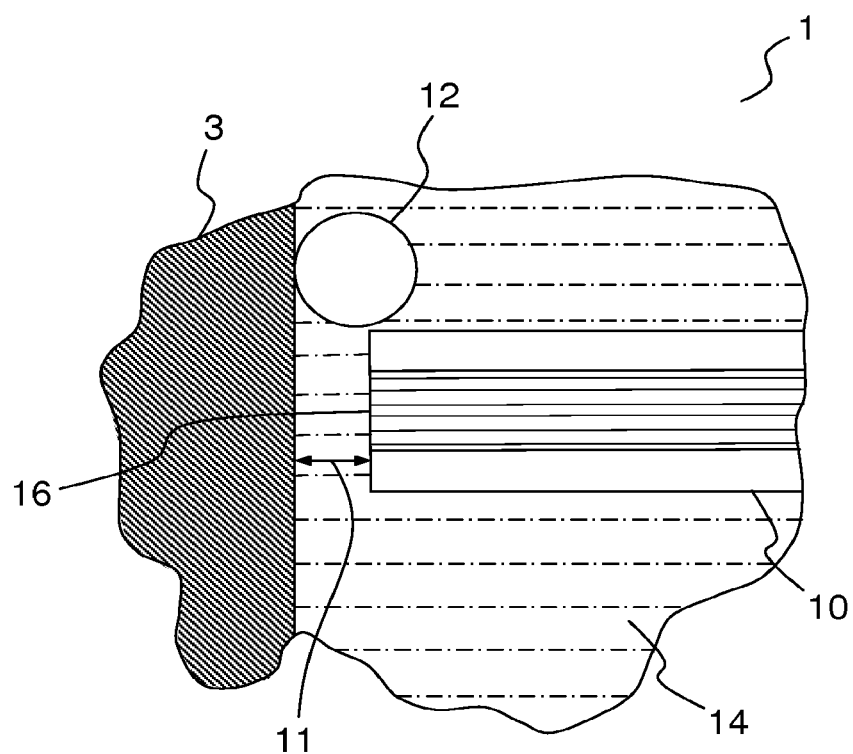
FIG. 2 shows a cross-sectional view of a portion of a connector according to a first embodiment coupled to a hollow-core optical fiber.

With reference to FIG. 2, the bubble 12 has a diameter larger than the interstice 11, i.e. the distance between the end 16 of the fiber 10 and the wall internal to the connector of the window 3 of the connector. The bubble 12 may nevertheless move in the volume defined by the second duct which is, apart from the bubble 12 itself, filled with liquid 14. On account of surface tensions, wetting angles and capillary forces, it is impossible for the bubble 12 to settle toward the core of the fiber 10 if its diameter is larger than the interstice 11.

The initial diameter of the bubble 12 (when it is injected into the connector 1) is therefore chosen, in one preferred embodiment, so that, throughout all the temperature cycles expected to be encountered during the desired use of the connector 1, it remains larger than the value of the interstice obtained when the fiber 10 is fitted in the connector 1. In other words, the minimum size of the bubble 12, corresponding to the maximum shrinkage of the bubble 12 at the maximum temperature to which the connector is subject, must be larger than the length of the interstice measured in the connector once the fiber 10 has been fitted. It is also possible to fit the fiber in the connector so that the interstice left between the window 3 and the end of the fiber 10 is sufficiently small to prevent the bubble 12 from getting between the fiber 10 and the window 3, even following a substantial variation in temperature.

With reference to FIGS. 1*b* and 2, provision may for example be made to ensure that the size of the interstice does not exceed one hundred microns. Furthermore, in the case of an interstice of about one hundred microns, a bubble of a minimum diameter of about two hundred microns may for example be injected into the connector, so as to avoid the aforementioned drawbacks.

Taking again the example of an interstice of about one hundred microns, if the diameter of the bubble is about 2 mm and the total volume of liquid in the fiber and in the connector is smaller than 20 µl, the bubble 12 will always possess a diameter larger than 100 µm, even if the temperature to which the connector is subject increases by 40° C. and even when the liquid is a liquid such as ethanol with a high expansion coefficient. Surface tension will then prevent the bubble from getting between the window 3 and the fiber 10.

Moreover, the sleeve 2 chosen for this first embodiment will for example be made of glass, metal or ceramic, and be of length shorter than or equal to 2 cm and of outside diameter smaller than or equal to 1 cm, typically a sleeve 2 having a length of 1 cm for an outside diameter of 4 mm will be chosen.

Figure 3A:
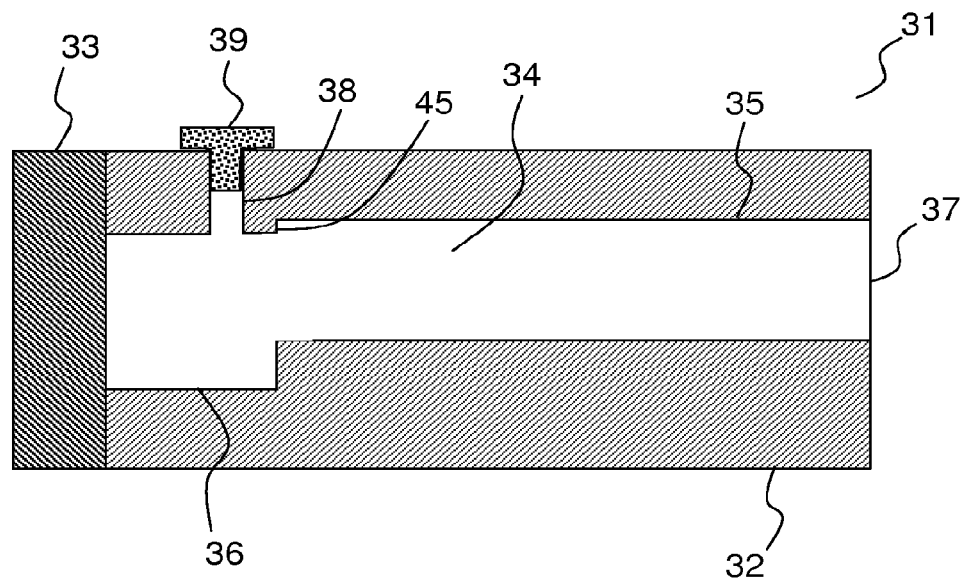
FIG. 3a shows a cross-sectional view of a connector according to a second embodiment.
Figure 3B:
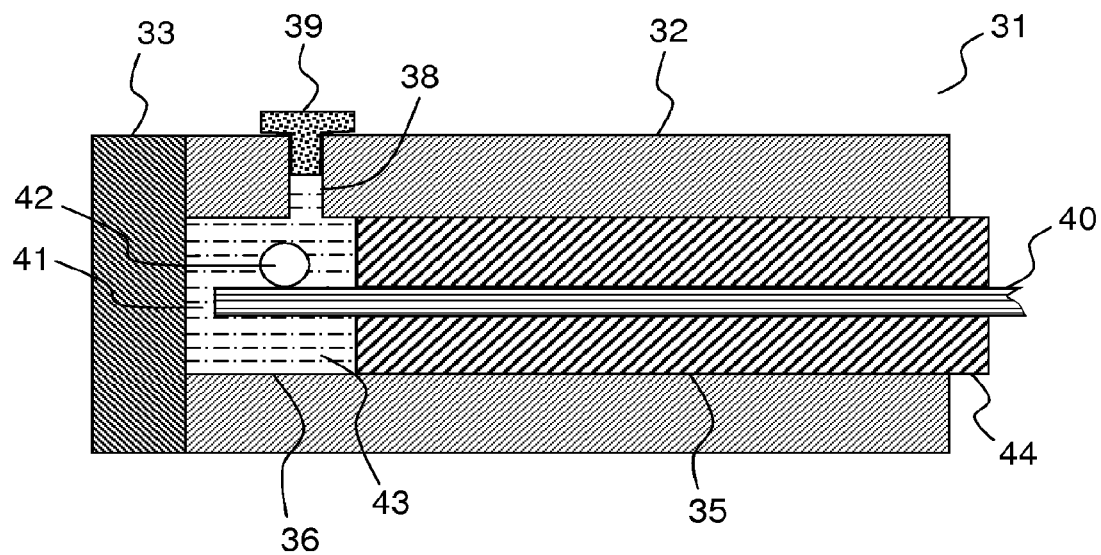
FIG. 3b shows a cross-sectional view of a connector according to a second embodiment coupled to a hollow-core optical fiber.

FIGS. 3*a* and 3*b* illustrate implementation of the proposed connector according to a second embodiment.

The connector shown in FIGS. 3*a* and 3*b* differs from that shown in FIGS. 1*a* and 1*b* in that it comprises a ferule into which the fiber is inserted and that is itself inserted into the first duct of the sleeve (which, thus, is larger than that of the connector shown in FIGS. 1*a* and 1*b*).

With reference to FIG. 3*a*, the proposed connector 31 may comprise a sleeve 32 and a window 33. The sleeve 32 has a tubular structure comprising a through-channel 34 in the direction of its length and resulting from two ducts 35 and 36 formed in the interior of the sleeve and of cross sections that are not necessarily different, said ducts 35, 36 being superposed so as to communicate and form the through-channel 34 of the sleeve 32. The connector 31 shown in FIG. 3*b* contains first and second coaxial ducts 35, 36 with the same cross sections, but as a variant a connector in which the first and second ducts 35, 36 are neither coaxial nor have the same cross sections could be produced, as illustrated in FIG. 3*a*. A first end of the channel 34 is formed at a first end 37 of the sleeve 32, and corresponds to a first duct 35, whereas the second end of the channel 34 is formed at the other end of the sleeve 32 (in the direction of its length) and corresponds to a second duct 36, of larger cross section than the first duct 35.

The first duct 35 is dimensioned so as to make it possible to insert therein a ferule (not shown in the figure), into which the end of an optical fiber (not shown in the figure) has been inserted, so as to couple the optical fiber to the connector 31. Once the optical fiber has been fitted in the ferule, the ferule is inserted via the corresponding end 37 of the sleeve 32 over substantially the entire length of the first duct 35. Preferably, the sleeve is for this purpose of length longer than or equal to that of the first duct 35 of the sleeve 32. In this embodiment, the connector 31 comprises a ferule used to couple the optical fiber to the connector 31.

Similarly to what was described above regarding the first embodiment, the wall of the sleeve 32 is drilled, above the internal volume defined by the second duct 36, right through its thickness, so that the sleeve 32 has on its surface an orifice via which it is possible to fill the connector 31 once the optical fiber has been fitted. The sleeve 32 thus contains a third duct 38 (which is not a constituent part of the through-channel 34 of the sleeve) drilled transversely, which extends from the exterior wall of the sleeve 32 to the wall of the second duct 36 in the interior of the sleeve 32. This third duct 38 is provided by way of duct for filling the internal volume of the connector 31 and the core of the optical fiber once the latter has been fitted in the first duct 35 of the connector 31. Provision is furthermore made to close hermetically the external orifice of this third duct 38, provided to fulfill the function of filling orifice, with a cap 39, in order to close it once the phase of filling the connector has terminated. In order to ensure the cap satisfactorily seals the opening, provision may be made for a flat, produced in the external wall of the sleeve level with the filling orifice, in the case of a sleeve having a curved cross section level with this orifice.

The ferule contains a channel over its entire length, said channel being intended to receive the optical fiber hermetically. Next, the fiber, inserted into the channel of the ferule, and the ferule are hermetically coupled by any known means. In one preferred example embodiment, the end of the optical fiber is inserted beforehand into the channel of the ferule, said channel being tailored to the outside diameter of the fiber, then the fiber is adhesively bonded to the ferule. Care will be taken during this operation to ensure that the adhesive does not block the aperture(s) of the fiber by using a sufficiently viscous adhesive. Moreover, it is preferable to use an adhesive compatible with the one or more liquids injected into the fiber. Specifically, as indicated above, it is possible to use the proposed connector, coupled to a fiber, with different liquids.

The advantage of using a ferule lies in the fact that it makes it possible to use various types of ferrules as adapters, these ferrules for example having a substantially circular cross section of a given diameter but containing channels of different sizes, so as to adapt various optical fiber diameters to connector sleeves containing a first duct of a given cross section and size. Thus, the use of a ferule in this second embodiment makes handling of the fiber easier and a certain uniformization of the rest of the connector possible, because by choosing ferrules of the same outside diameter and of inside diameter tailored to the outside diameters of the various types of fibers used, any variability in fiber diameter is accommodated for by the choice and dimensions of the ferule, the rest of the connector being designed around the set outside diameter of the ferule.

With reference to FIG. 3*b*, the ferule 44 (coupled to its fiber 40) is then hermetically fastened in the first duct 35 of the sleeve 32. In one preferred embodiment, the ferule 44 is inserted into the first duct 35 of the sleeve 32 over the entire length of the first duct 35. The inside diameter of the first duct 35 is preferably tailored to the outside diameter of the ferule 44 in order to guide and support the ferule as it is slid into the interior of the first duct 35.

Again with reference to FIG. 3b, the coupling between the fiber 40 and the ferule 44, on the one hand, and between the ferule 44 and the first duct 35 of the sleeve 32, on the other hand, is hermetic, i.e. the space between the external sheath of the fiber 40 and the channel of the ferule 44, on the one hand, and the space between the external sheath of the ferule 44 and the walls of the duct 35, on the other hand, are hermetically closed. This hermetic coupling between the fiber 40 and the ferule 44, on the one hand, and between the ferule 44 and the first duct 35 of the sleeve 32, on the other hand, may be achieved by any known means, and especially by adhesive bonding, as indicated above.

The other features of the connector described with regard to the first embodiment, and especially with respect to the phase of filling with liquid 43 and the injection of a gas bubble 42, may be employed in the context of an implementation of the invention according to the second embodiment described above.

In particular, the internal volume of the sleeve 32 defined by the second duct 36 is closed at the corresponding end of the sleeve by a window 33 that seals the assembly and allows the connector to be optically coupled to a light source. The window 33 may be hermetically fastened to the sleeve by adhesive bonding or, as a variant, by any hermetic fastening means known per se. The sleeve 32 also contains a third duct 38 drilled transversely, that extends from the exterior wall of the sleeve 32 to the wall of the second duct 36 in the interior of the sleeve 32. This third duct 38 is provided by way of duct for filling the internal volume of the connector 31 and the core of the optical fiber 40 once the latter has been fitted in the connector 31 using the ferule 44. Provision is furthermore made to close hermetically the external orifice of this third duct 38, provided to fulfill the function of filling orifice, with a cap 39, in order to close it once the phase of filling the connector 31 has terminated. Here again, in order to ensure the cap satisfactorily seals the opening, provision may be made for a flat, produced in the external wall of the sleeve level with the filling orifice, in the case of a sleeve having a curved cross section level with this orifice.

In the nonlimiting example in FIG. 3b, the optical fiber 40 is inserted into the channel of the ferule 44 over a length longer than that of the channel, and the ferule is inserted into the first duct 35 over the entire length of the latter, so that the end of the optical fiber 40 penetrates into the internal volume of the sleeve defined by the second duct 36. The fiber 40 inserted into the connector 31 is inserted over a length not exceeding the cumulative length of the first and second ducts, so that the end of the fiber 40 inserted into the connector 31 does not make contact with the wall internal to the connector of the window 33. This defines a space 41, which is here referred to by the term "interstice", in the volume defined by the second duct 35, between the end of the fiber 40 and the portion of the surface of the internal wall of the window 33 opposite thereto.

With reference to FIG. 3a, a protrusion 45 forming an abutment during the insertion of the ferule 44 may be provided between the first and second ducts 35, 36, so as to guide insertion of the ferule 44 in the sleeve 32 of the connector 31. Since the length of the second duct 36 is known, it is then possible to determine with precision the length of the interstice 41 that it is desired to obtain once the fiber has been fitted, i.e. once the ferule coupled to its fiber has been inserted into the first duct over the entire length of the latter.

The connector 31 may then be filled, the gas bubble 42 injected, and the connector sealed using the hermetic cap 39 as explained above with regard to the first embodiment.

The sleeve 32 chosen for this second embodiment may for example be made of glass, metal or ceramic, and have a length of about 1 cm for an outside diameter of 4 mm, and the ferule 44 chosen for this second embodiment may for example be made of glass, ceramic or a composite, and have a length of 13 mm for an outside diameter of 2.5 mm.

Figure 4A:
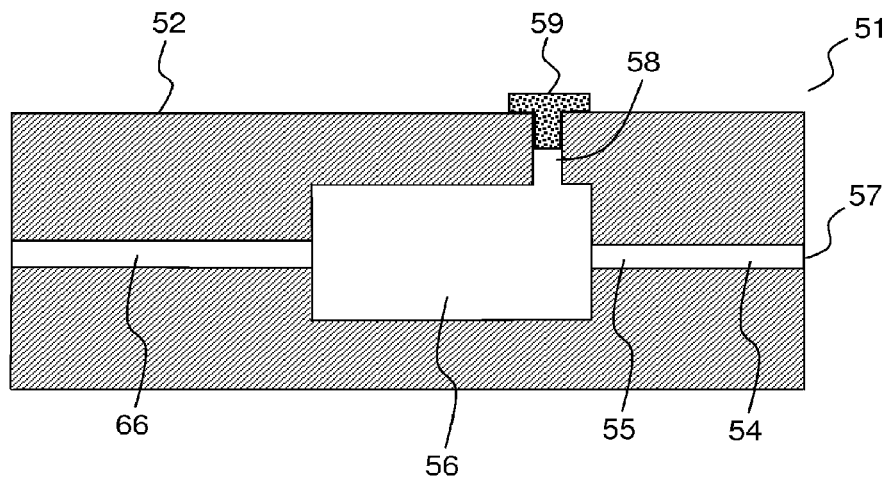
FIG. 4a shows a cross-sectional view of a connector according to a third embodiment.
Figure 4B:
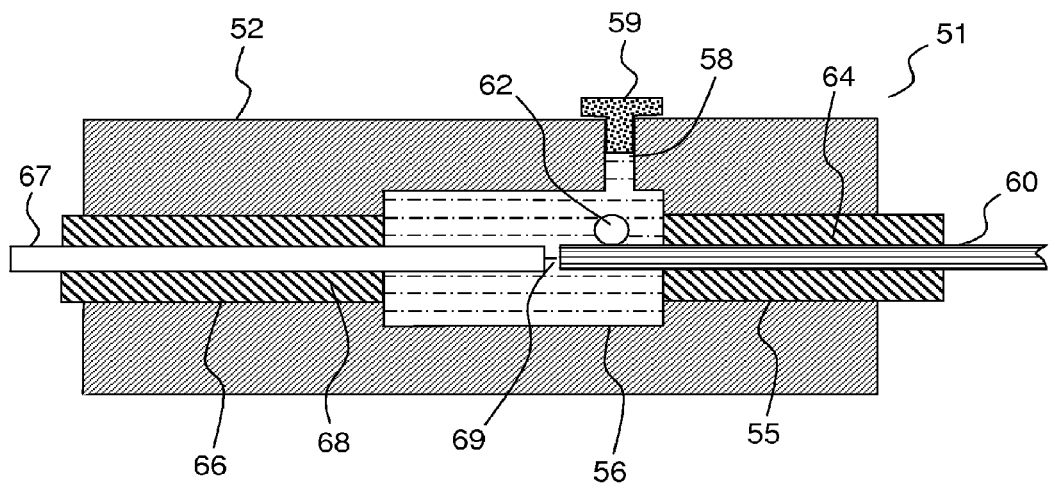
FIG. 4b shows a cross-sectional view of a connector according to a third embodiment coupled to two optical fibers, one of which is a hollow-core fiber.

FIGS. 4a and 4b illustrate one implementation of the proposed connector according to a third embodiment.

With reference to FIG. 4a, the proposed connector 51 may have a double-input structure insofar as the second duct 56 may be extended by a fourth duct 66 of dimensions that may be similar to those of the first duct 55. The connector 51 may comprise a sleeve 52 having a tubular structure containing a through-channel 54 in the direction of its length and resulting from three ducts 55, 56, 66 formed in the interior of the sleeve 52, said ducts 55, 56, 66 being superposed so as to communicate and form the through-channel 54 of the sleeve. Preferably, the cross sections of the first and fourth ducts 55, 66 are of substantially identical dimensions, given that an optical fiber is meant to be inserted into each of them. In this embodiment, the cross section of the second duct will be chosen to be substantially larger in size than the cross sections of the first and fourth ducts, given that the volume defined by the second duct 56 is intended to serve as a reservoir of liquid containing a gas bubble, and that a volume defined by the outside diameter of an optical fiber would run the risk of being too small.

Again with reference to FIG. 4a, the first and fourth ducts 55, 66 may be formed substantially coaxially so that the ends of the optical fibers inserted into these ducts face each other, one of the fibers being used as an access fiber generating an optical beam directed toward the second fiber.

This embodiment of the proposed connector is applicable to the case where only one of the fibers fitted in the connector is a liquid-core fiber, but also to the case where both fibers fitted in the connector are liquid-core fibers.

The first and fourth ducts 55, 66 may be formed and/or dimensioned so as to make it possible to insert into each of these two ducts one end of two separate optical fibers to which the connector 51 is to be coupled. For the first duct 55, one end of a hollow-core optical fiber is inserted via the corresponding end 57 of the sleeve 52 over substantially the entire length of the duct 55. For the fourth duct 66, one end of an optical fiber (not necessarily a hollow-core fiber) is inserted via the other end of the sleeve 52 over substantially the entire length of the duct 66. Each of the two optical fibers is hermetically coupled to the connector 51, by way of the first and fourth ducts 55, 66, respectively, i.e. the space between the external sheath of the fiber and the walls of the duct 55 and 66 in which it is inserted is hermetically closed. This hermetic coupling between each fiber and the first and fourth ducts 55, 66 of the channel 54 may be achieved by any known means.

In this third embodiment, that end of the second duct 56 which is opposite the end communicating with the first duct 55 is hermetically closed by the fourth duct 66, in which provision is made to fit an optical fiber hermetically. The second duct 56 has an aperture at its two ends, one communicating with the first duct 55, and the other communicating with the fourth duct 66. Each of these apertures is hermetically closed once optical fiber ends have been hermetically inserted into each of the first and fourth 55, 66 ducts. In particular, the connector 51 is equipped with means for hermetically closing that end of the second duct 56 which is opposite that end communicating with the first duct 55, these means comprising the fourth duct 66, into which an optical fiber has been hermetically inserted.

Similarly to what was described above regarding the first and second embodiments, the wall of the sleeve 52 is drilled, above the internal volume defined by the second duct 56, right through its thickness, so that the sleeve 52 has on its surface an orifice via which it is possible to fill the connector 51 once the optical fiber has been fitted. The sleeve 52 thus contains a third duct 58 (which is not a constituent part of the through-channel 54 of the sleeve) drilled transversely, which extends from the exterior wall of the sleeve 52 to the wall of the second duct 56 in the interior of the sleeve 52. This third duct 58 is provided by way of duct for filling the internal volume of the connector 51 and the core of the optical fiber once the latter has been fitted in the first duct 55 of the connector 51. Provision is furthermore made to close hermetically the external orifice of this third duct 58, provided to fulfill the function of filling orifice, with a cap 59, in order to close it once the phase of filling the connector has terminated. In order to ensure the cap satisfactorily seals the opening, provision may be made for a flat, produced in the external wall of the sleeve level with the filling orifice, in the case of a sleeve having a curved cross section level with this orifice.

With reference to FIG. 4b, the hollow-core optical fiber 60 is inserted into the first duct of the connector 51 shown in FIG. 4a, except that the optical fibers are shown inserted by way of a ferule 64 and 68, in accordance with the corresponding description of the second embodiment. The operating principle and implementation of the hollow-core fiber/connector coupling are in accordance with the preceding description given with regard to the second embodiment.

The first duct 55 is therefore dimensioned so as to make it possible to insert therein a ferule 64, into which the end of the hollow-core optical fiber 60 has been hermetically inserted, so as to couple the optical fiber 60 to the connector 51. Likewise, the fourth duct 66 is dimensioned so as to allow a ferule 68 to be inserted therein, into which the end of an optical fiber 67 has been inserted hermetically, so as to couple the optical fiber 67 to the connector 51. Once the optical fibers 60, 67 have been fitted in their respective ferules 64, 68, the ferules 64 and 68 are inserted via the corresponding end of the sleeve 52 over substantially the entire length of the first duct 55 and of the fourth duct 66, respectively.

Each ferule 64 and 68 contains a channel over its entire length, intended to receive an optical fiber hermetically. Next, the fiber 60 and 67 inserted into the channel of its ferule 64 and 68 is hermetically coupled thereto by any known means.

With reference to FIG. 4b, the ferule 64 (coupled to its fiber 60) is then hermetically fastened in the first duct 55 of the sleeve 52. In one preferred embodiment, the ferule 64 is inserted into the first duct 55 of the sleeve 52 over the entire length of the first duct 55. The inside diameter of the first duct 55 is preferably tailored to the outside diameter of the ferule 64 in order to guide and support the ferule as it is slid into the interior of the first duct 55. Likewise, the ferule 68 coupled to its fiber 67 is hermetically fastened in the fourth duct 66 of the sleeve 52.

The coupling between the fiber 60 and the ferule 64, on the one hand, and between the ferule 64 and the first duct 55 of the sleeve 52, on the other hand, is hermetic, i.e. the space between the external sheath of the fiber 60 and the channel of the ferule 64, on the one hand, and the space between the external sheath of the ferule 64 and the walls of the duct 55, on the other hand, are hermetically closed. Likewise, the coupling between the fiber 67 and the ferule 68, on the one hand, and between the ferule 68 and the fourth duct 66 of the sleeve 52, on the other hand, is hermetic. This hermetic coupling may be achieved by any known means, and especially by adhesive bonding, as indicated above.

In the nonlimiting example in FIG. 4b, the optical fiber 60 is inserted into the channel of the ferule 64 over a length exceeding that of the channel, and the ferule 64 is inserted into the first duct 55 over the entire length of the latter, so that the end of the optical fiber 60 penetrates into the internal volume of the sleeve defined by the second duct 56. Likewise, the optical fiber 67 is inserted into the channel of the ferule 68 over a length exceeding that of the channel, and the ferule 68 is inserted into the fourth duct 66 over the entire length of the latter, so that the end of the optical fiber 67 penetrates into the internal volume of the sleeve defined by the second duct 56.

Neither of the fibers 60 and 67 is inserted into the connector 51 over a length exceeding the cumulative length of the first and second ducts, and fourth and second ducts, respectively. The first and fourth ducts shown in FIG. 4b are coaxial, so that the ends of the fibers 60 and 67 face each other, and the length of insertion of the fibers beyond the respective lengths of the first and fourth ducts 55, 66 are chosen so as to leave a space 69 between the ends of the fibers 60 and 67 inside the volume defined by the second duct 56.

Thus, the two fiber ends do not make contact with each other, the space 69 preserved between them serving to ensure that liquid is able to access the aperture of the hollow-core fiber 60 during the phase for filling this fiber. Preferably, this space 69 will however be chosen to be as small as possible (while bearing in mind the aforementioned filling constraint) in order to ensure an optimal optical coupling between the access fiber 67 and the hollow-core fiber 60.

Next, the connector 51 may be filled, the gas bubble 62 injected, and the connector sealed using the hermetic cap 59 as explained above with regard to the first embodiment.

Figure 5:
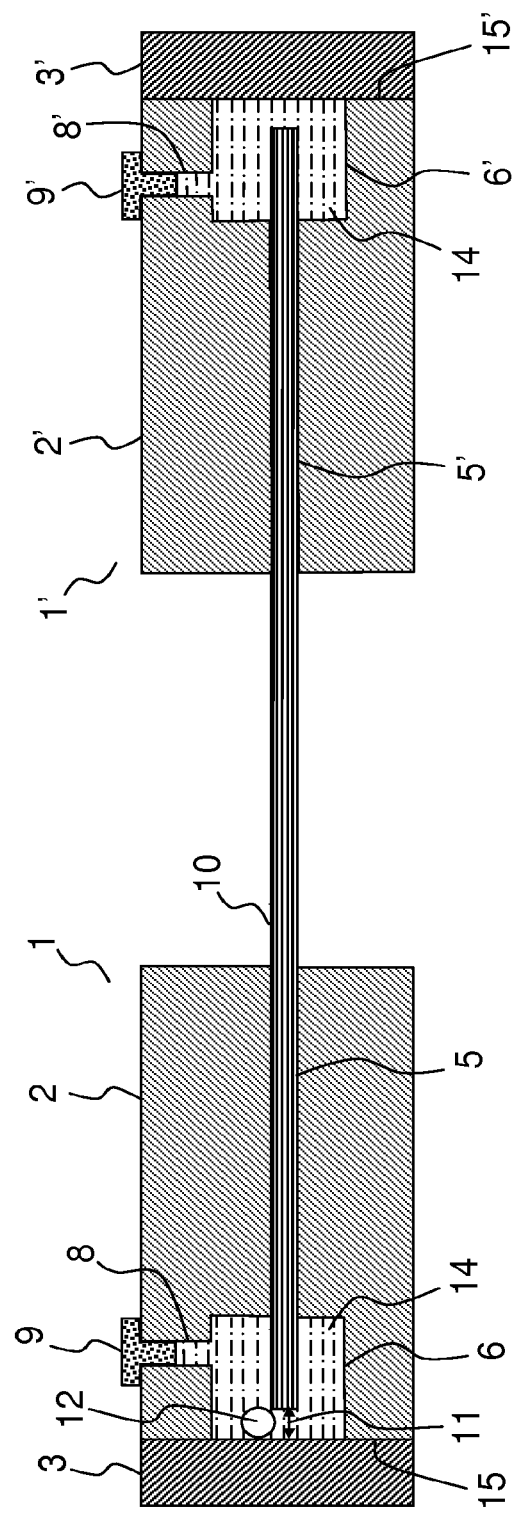
FIG. 5 shows a cross-sectional view of a liquid-core optical fiber coupled to two connectors.

FIG. 5 shows one variant of the liquid-core optical fiber device according to the present description and its implementation.

According to this variant, each of the ends of a liquid-core fiber is inserted into a connector, respectively, at least one corresponding to a connecting device according to the present description.

With reference to FIG. 5, the two connectors are respectively numbered 1 and 1'.

The first connector 1 comprises the elements illustrated in FIG. 1.

The second connector 1' comprises, in this example, elements that are structurally and functionally similar to those of the first connector. It especially comprises a sleeve 2' of tubular structure through which a channel comprising a plurality of superposed and communicating ducts passes, which channel is arranged to receive the optical fiber 10, a first duct 5', a second duct 6', closing means 3' hermetically closing the end of the second duct 6', a third duct 8' intended for filling the interior volume of the second duct, a hermetic closing cap 9' and the liquid 14 contained in the second duct 6'.

In the nonlimiting example in FIG. 5, one of the ends of the hollow-core optical fiber 10 is inserted into the first duct 5 of the first connector 1 over the entire length of the first duct, so that the end of the optical fiber penetrates into the second duct 6 of the first connector. The second end of the same optical fiber is inserted into the first duct 5' of a second connector 1' over the entire length of the first duct, so that the end of the optical fiber penetrates into the internal volume defined as the second duct 6' of the second connector.

It is then possible to fill the first connector 1. When the filling liquid is injected via the external orifice of the third duct 8, the liquid 14 first fills the lower part of the volume of the second duct 6, then the core of the fiber 10 by capillary action, air present in the core being pumped from the fiber via the other end of the latter located in the unsealed second connector, before the top part of the second duct 6 and then the third duct 8 are filled. Next, the bubble 12 is injected and the first connector 1 sealed using the hermetic cap 9 as explained above with regard to the first embodiment. It is then possible to completely fill the second connector 1'.

With reference to FIG. 5, no bubble is injected into the connector 1' and the connector 1' is sealed using the hermetic cap 9'. In one procedural mode (not shown), it is possible, after the second connector 1' has been filled, to inject a bubble into the second duct 5' of the second connector and then seal this connector using a hermetic cap 9'.

In this variant, the connectors may for example correspond to the first, second or third embodiment.

Depending on the embodiment chosen, certain steps, actions, events or functions of each of the methods described in the present document may be carried out or occur in an order different to that in which they have been described, or may be added, merged or even not occur or be carried out, depending on the circumstances. Furthermore, in certain embodiments, certain steps, actions or events are carried out or occur concurrently and not successively.

Although the connection of an optical fiber has been described with regard to a limited number of embodiments, those skilled in the art having read the present description will understand that other embodiments may be envisioned without departing from the scope of the optical fiber connection such as described herein. The scope of the optical fiber connection is limited only by the appended claims.

The invention claimed is:

1. An optical device having liquid-core optical fiber, comprising:
    at least one first connecting device comprising:
        a sleeve of tubular structure through which a channel comprising a plurality of superposed and communicating ducts passes, a first duct being formed from one end of the sleeve and being arranged to receive hermetically at the corresponding end of the sleeve one end of the optical fiber, and a second duct being formed communicating with the first duct; and
        closing means hermetically closing that end of the second duct which is opposite the end communicating with the first duct,
    wherein the sleeve further contains a third duct intended for filling the interior volume of the second duct when the latter is closed at one end by the closing device and the fiber is inserted into the first duct, the third duct connecting transversely the exterior of the sleeve to the interior of the second duct;
    a hermetic closing cap for hermetically closing the orifice of the third duct opening onto the exterior of the sleeve;
    a liquid-core optical fiber a first end of which is inserted into the first connecting device,
    wherein the interior volume of the second duct of the first connecting device comprises the liquid and a gas bubble and the third duct of the first connecting device is hermetically closed by the closing cap.

2. The device as claimed in claim 1, wherein the insertion length of the optical fiber is longer than the length of the first duct, so as to pass through the first duct and penetrate into the second duct, without making contact with the closing device of the first connecting device.

3. The device as claimed in claim 2, wherein the diameter of the gas bubble is larger than the distance between the first end of the optical fiber inserted into the channel of the sleeve and the closing device of the first connecting device.

4. The device as claimed in claim 1, wherein the closing means comprise a window hermetically closing the sleeve at its end corresponding to the second duct, the window enabling optical coupling.

5. The device as claimed in claim 1, wherein the closing means comprise a superposed fourth duct communicating with the second duct in the channel of the sleeve, formed from the other end of the sleeve and arranged to receive hermetically at the corresponding end of the sleeve one end of an optical fiber, in which the first and fourth ducts are coaxial, and wherein the closing means further comprise an end of an optical fiber hermetically inserted into the fourth duct.

6. The device as claimed in claim 1, wherein the first connecting device further comprises a ferule containing over its entire length a channel arranged to receive hermetically a first end of the optical fiber, and wherein the first duct is arranged to receive the ferule hermetically at the corresponding end of the sleeve.

7. The device as claimed in claim 6, wherein the first and second ducts are coaxial and of the same diameter, and in which the ferule has a diameter corresponding to that of the first and second ducts in order to be inserted hermetically over its entire length into the first duct.

8. The device as claimed in claim 1, further comprising a second connecting device into which a second end of the liquid-core optical fiber is inserted.

9. The device as claimed in claim 8, wherein the first and second connecting devices are identical.

10. A method for producing an optical device having liquid-core optical fiber according to claim 1, the method comprising:
    inserting a first end of a liquid-core optical fiber hermetically into the first duct of the sleeve of the first connecting device over a length smaller than the cumulative length of the first and second ducts;
    filling the interior volume of the sleeve of the first connecting device made up of the second and third ducts via the external orifice of the third duct with a liquid provided to fill the core of the optical fiber; and
    closing, after the filling has ended, the orifice of the third duct so as to inject into the interior volume a gas bubble.

11. The method as claimed in claim 10, wherein the interior volume of the sleeve of the first connecting device is only partially filled, and the gas bubble is injected by closing the external orifice of the third duct with the closing cap.

12. The method as claimed in claim 11, wherein a level of partial filling of the interior volume of the sleeve of the connecting device is determined, and in which a closing cap of preset length is used to plug the third duct so as to inject, into the interior volume, when the external orifice of the third duct is closed with the closing cap, a gas bubble of preset volume.

13. The method as claimed in claim 11, wherein the interior volume of the connecting device is partially filled to a preset level corresponding to a preset volume of the gas bubble injected into the interior volume when the external orifice of the third duct is closed.

14. The method as claimed in claim 10, wherein the optical fiber is inserted into the sleeve over a length longer than that of the first duct, so as to pass through the first duct and penetrate into the second duct, without making contact with the closing device of the connecting device.

15. The method as claimed in claim 10, wherein the gas bubble is injected so as to inject a gas bubble of diameter larger than the distance between the end of the optical fiber inserted into the channel of the sleeve and the closing device of the connecting device.

16. The method as claimed in claim 10, wherein the ends of a liquid-core optical fiber are inserted into the first connecting device and into a second connecting device, respectively.

* * * * *